Patented Aug. 22, 1950

2,519,870

UNITED STATES PATENT OFFICE 2,519,870

MOLDING MATERIALS AND METHOD OF PRODUCING SAME

Alfonso Amigo, London, England

No Drawing. Application June 25, 1947, Serial No. 757,053. In Great Britain February 5, 1946

5 Claims. (Cl. 260—29.6)

This invention relates to moulding materials and especially to plastic materials, and to a process for the manufacture thereof.

The invention aims at providing moulding materials which are capable of being moulded at room temperature and without the application of high pressure, and to a process for the manufacture of such materials.

The process of the present invention broadly comprises first preparing a viscous solution of a suitable synthetic resin or mixture of synthetic resin in an organic solvent therefor, incorporating water or an aqueous liquid with said viscous synthetic resin solution until an emulsion is obtained in which the resin solution constitutes the continuous phase and the water or aqueous liquid the disperse phase, thoroughly incorporating a filler in discrete form, with said emulsion, and allowing the volatile constituents of the synthetic resin solvent to evaporate so as to bring about a gradual deposition of the synthetic resin on the particles of filler.

Suitable synthetic resins for the purpose of the present invention are for example polyvinyl resins, such as polyvinyl acetates, polyvinyl acetals, polyvinyl chloride and co-polymers of polyvinyl acetate and polyvinyl chloride. Also polystyrene, polymethyl-methacrylate, polymerized esters of acrylic and methacrylic acids.

Suitable fillers for the purposes of the present invention are for example, jute, sisal, cotton, wool, asbestos, glass or wood, natural and artificial silk fibres, also ground paper pulp, wood flour and ground leather scrap, and cereal husks such as oat husks, rice bale and coffee constituents. If desired, other suitable materials, such as pigments, colours, dyes, plasticisers, oil or wax emulsions and other suitable preparations can be incorporated with the mix.

Whilst the mechanism of the hereindescribed process has not yet become fully apparent, the following explanation thereof can be advanced for the purposes of facilitating an understanding of the invention:

In the preparation of the colloidal solution of the suitable resin or mixture of resins, the choice of solvents used will depend on the type of resin or resins used, but it is advisable to employ a mixture of organic solvents which comprises solvents and non-solvents for the particular type or types of resins used. The major part of the solvents should have a higher evaporation rate than the non-solvents used. Preferably a part of the organic solvents used should be soluble in or miscible with water.

The resin is dispersed in the solvents and a viscous colloidal solution is obtained. By adding to the resin solution under vigorous mechanical stirring, a certain quantity of water, an emulsion is obtained which is of the water-in-oil type, the resin solution constituting the outer or continuous phase, while the water constitutes the inner or dispersed phase. A thick creamy emulsion is obtained which is stable and can be stored.

This emulsion, which exhibits very little tackiness is now used for the preparation of a so-called "dough," which is ultimately used for the preparation of mouldings, sheets, laminated products, wood fillers and the like.

In order to prepare the dough, the emulsion is introduced into an open kneader or mixer and fibres, or mixtures of fibres and other ingredients such as hereinbefore set forth, are gradually added and are thoroughly mixed and kneaded in.

During the mixing process the more volatile of the resin solvents commence to evaporate and as the kneading and addition of fillers proceeds, the emulsion changes from one of the water-in-oil type to one of the oil-in-water type. The resin solution, which, due to the loss of the more volatile solvents is now far more concentrated and viscous, now constitutes the inner, dispersed phase, while water constitutes the outer or continuous phase. This change is gradually followed by creaming, and as, at this stage the filler is already well and uniformly distributed throughout the mixture, the creamed viscous resinous phase envelops the fibres and forms a binder, while the aqueous outer phase forms an aqueous film over resin and fibres.

After the mixing process has been completed the dough is allowed to age for a period, the length of which depends to a certain degree on the type of filler used, and especially on the behaviour of the filler towards water and organic solvents. During this ageing period, the creaming and separation of the resinous phase continues.

The kneading and ageing operation is preferably carried out at a temperature below 20° C. and after ageing, the dough is ready for forming, moulding, rolling into sheets, or other fabricating processes.

Said dough can be moulded in moulds or formed on suitable mandrels of wood, plaster of Paris, concrete, glass, metal or the like, at room temperature without the use of high pressure. A plurality of laminations of the material may be used to build up composite bodies of suitably high rigidity. Alternatively, the material can be rolled out to form sheets. Such sheets can be reinforced with the aid of suitable fabrics, wire mesh or the like, by rolling the material into said fabric, wire mesh or the like. After completion of the moulding or forming operation the shapes are dried.

The invention will be illustrated by the following examples in which the parts referred to are parts by weight.

Example I 20 parts of polyvinyl resin known under the trade name "Gelva 25" (being a polymerized vinyl acetate resin with a viscosity of 25 centipoise in a molecular solution in benzol at 20° C.) and 15 parts of polyvinyl resin, known under the trade name "Gelva 60" (being similar to the aforesaid "Gelva 25" but specifying 60 centipoise) are dissolved in a mixture consisting of 20 parts of acetone, 4 parts of benzene, 3 parts of butylacetate and 3 parts of methylated spirit serving as solvent, and 35 parts of a petroleum hydrocarbon of a similar boiling range to toluene (such as a lacquer petrol known under the trade name "Shell-Mex X3" (being similar to toluol and having a density of 0.800; a flash point of 76° F.; and a boiling range of 100–120° C.) with a boiling range of 100 to 120° C.) serving as non-solvent. The viscous colloidal solution thus obtained is next converted into an aqueous emulsion by the gradual addition thereto of 1 part of water per 4 parts of resin solution while vigorously stirring with the aid of mechanical means, such as stirrers, emulsifiers, colloid mills or the like, to form a thick creamy aqueous emulsion which is non-sticky and cannot be used as adhesive.

10 parts of the emulsion obtained are then placed in an open kneading machine and 3 parts of jute fibres are gradually added and well kneaded in. During the kneading process, the volatile solvent commences to evaporate and the aqueous emulsion progressively creams, whereupon the resin is deposited on the fibres. Preferably, the mixing operation is carried out at a temperature below 20° C.

After the mixing or kneading operation has been completed, the resultant product is transferred to storage containers and is allowed to age for a period of 24 hours or more, whereby further deposition of the resin on the jute fibres takes place and a non-tacky material for further moulding or forming operations is obtained.

Example II 18 parts of polyvinyl resin known as "Alvar 1580" (being a polymerized vinyl acetate resin, derived from a polyvinyl acetate resin having a viscosity of 15 centipoise in molecular solution in benzol at 20° C., by hydrolysing and replacement of 80% of the acetate groups by acetaldehyde) and 6 parts of Celluloid (film scrap) are dissolved in a mixture of organic solvents consisting of 22 parts of acetone, 5 parts of butylacetate, 5 parts of toluene, 6 parts of methylated spirit and 40 parts of a petroleum hydrocarbon similar in boiling range to xylol (such as a product known under the trade name "Shell Mex X12" (being similar to xylol and having a density of 0.805; a flash point of 80° F.: and a boiling range of 136–150° C.)). A uniform viscous resin solution is obtained by vigorous stirring. This resin solution is then converted into an emulsion by the gradual addition of water, at the rate of 1 part of water for each 4½ parts of resin solution, while vigorously stirring with the aid of mechanical means, such as stirrers, colloid mills, emulsifiers and the like.

10 parts of the resultant thick and creamy emulsion are then placed in an open kneader, which is water-jacketed to keep the temperature of the mix within the desired range, i. e. below 20° C. 3½ parts of rayon flock are gradually added to the kneader and well mixed. After all the fibres have been added, and well mixed in, the resultant dough is transferred to a storage container and allowed to age for 2 to 3 hours before use. The resulting material can then be rolled into sheets or moulded over suitable mandrels.

I claim:

1. The process for the production of molding materials which comprises first dissolving a synthetic resin selected from the group consisting of polyvinyl acetate, polyvinyl acetal, polyvinyl chloride and copolymers of polyvinyl acetate and polyvinyl chloride, polystyrene, polymethylmethacrylate, polymerized esters of acrylic and methacrylic acids in an organic liquid mixture containing a solvent for said resin to thereby form a viscous solution, then mixing water with said viscous synthetic resin solution until a viscous emulsion is obtained in which the resin solution constitutes the continuous phase and the water the disperse phase, thoroughly mixing filler material in discrete form with said viscous emulsion at a temperature below 20° C. to thus produce a uniform mass of doughy consistency, and thereafter allowing volatile constituents of the solvent for said synthetic resin to evaporate so as to bring about a gradual deposition of the synthetic resin on to said filler.

2. The process for the production of molding materials which comprises first dissolving a synthetic resin selected from the group consisting of polyvinyl acetate, polyvinyl acetal, polyvinyl chloride and co-polymers of polyvinyl acetate and polyvinyl chloride, polystyrene, polymethylmethacrylate, polymerized esters of acrylic and methacrylic acids in a mixture of organic liquids, at least one of said liquids being a solvent for said resin and at least one other of said liquids being miscible with water to thereby form a viscous solution, then mixing water with said viscous synthetic resin solution until a viscous emulsion is obtained in which the resin solution constitutes the continuous phase and the water the disperse phase, thoroughly mixing filler material in discrete form with said viscous emulsion at a temperature below 20° C. to thus produce a uniform mass of doughy consistency, and thereafter allowing volatile constituents of the solvent for said synthetic resin to evaporate so as to bring about a gradual deposition of the synthetic resin on to said filler.

3. The process for the production of molding material which consists in first dissolving a thermoplastic polyvinyl resin in an organic solvent to form a viscous solution of said resin, then mixing water with said viscous solution until an emulsion is obtained in which the solution of resin in said organic solvent constitutes the continuous phase and the water the disperse phase, thoroughly mixing filler material in discrete form with said viscous emulsion at a temperature below 20° C. to thereby produce a uniform mass of doughy consistency, and thereafter allowing volatile constituents of said solvent for said polyvinyl resin to evaporate so as to bring about a gradual deposition of said polyvinyl resin onto said filler.

4. The process for the production of molding material which comprises first dissolving a thermoplastic polyvinyl acetal in an organic solvent to form a viscous solution of said polyvinyl acetal, then mixing water with said viscous solution until an emulsion is obtained in which the solution of polyvinyl acetal in said organic solvent constitutes the continuous phase and the water the disperse phase, thoroughly mixing filler material in discrete form with said viscous emulsion to thereby produce a uniform mass of doughy consistency, and thereafter allowing said mass to age for about two to twenty-four hours thereby to permit volatile constituents of said solvent for said polyvinyl acetal to evaporate so as to bring about a gradual deposition of said polyvinyl acetal onto said filler, said mixing and ageing being carried out at a temperature below 20° C.

5. The process for the production of molding material which comprises first dissolving a thermoplastic polyvinyl acetate in an organic solvent to form a viscous solution of said polyvinyl acetate, then mixing water with said viscous solution until an emulsion is obtained in which the solution of polyvinyl acetate in said organic solvent constitutes the continuous phase and the water the disperse phase, thoroughly mixing filler material in discrete form with said viscous emulsion to thereby produce a uniform mass of doughy consistency, and thereafter allowing said mass to age for about two to twenty-four hours thereby to permit volatile constituents of said solvent for said polyvinyl acetate to evaporate so as to bring about a gradual deposition of said polyvinyl acetate onto said filler, said mixing and ageing being carried out at a temperature below 20° C.

ALFONSO AMIGO.

REFERENCES CITED

The following references are of record in the file of this patent:

UNITED STATES PATENTS

| Number | Name | Date |
|---|---|---|
| 1,299,706 | Gudge | Apr. 9, 1919 |
| 1,722,554 | Bradley | July 30, 1929 |
| 2,389,460 | Rinehart | Nov. 20, 1945 |
| 2,393,874 | Trent | Jan. 29, 1946 |
| 2,424,458 | Heijmer | July 22, 1947 |